Oct. 12, 1965

A. W. DIECK ETAL 3,211,450

STRIP FEEDER CONTROLS FOR PRESSES

Filed July 2, 1963

INVENTORS
A. W. DIECK
F. WAHL
A. H. WERNER

BY
ATTORNEY

Oct. 12, 1965  A. W. DIECK ETAL  3,211,450
STRIP FEEDER CONTROLS FOR PRESSES
Filed July 2, 1963  5 Sheets-Sheet 5
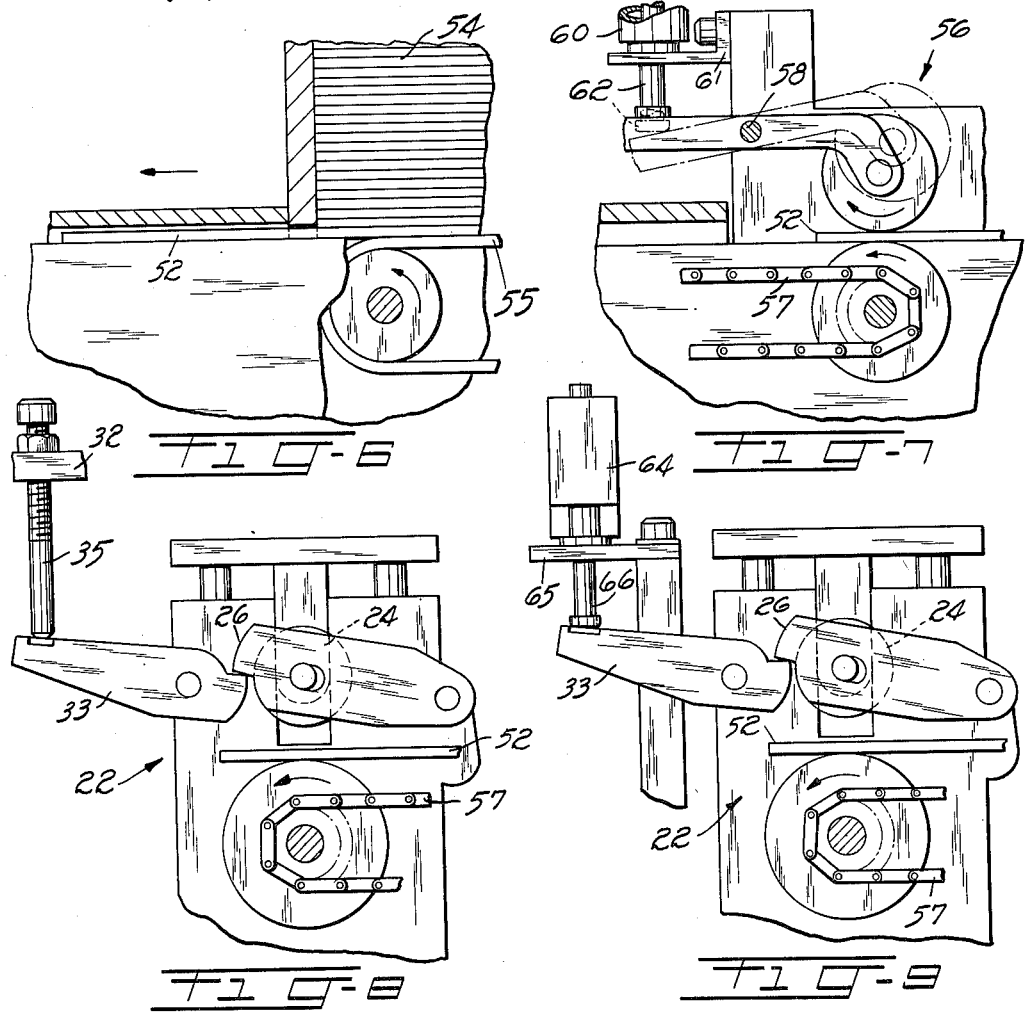
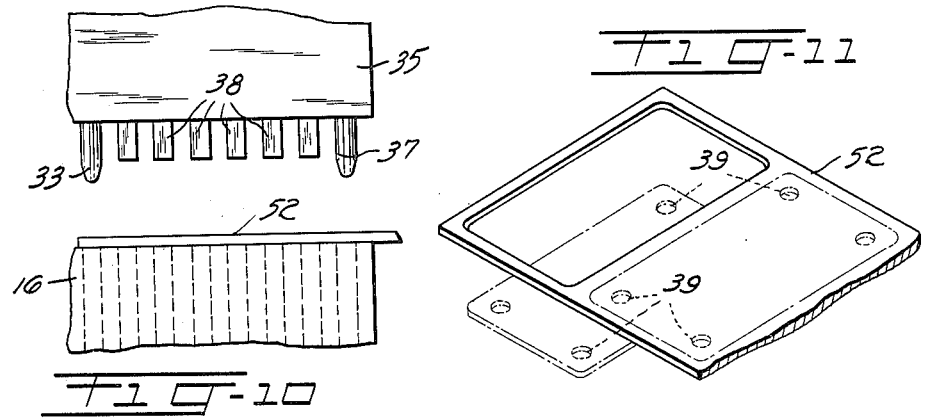

United States Patent Office 3,211,450
Patented Oct. 12, 1965

3,211,450
STRIP FEEDER CONTROLS FOR PRESSES
Adolph W. Dieck, Weehawken, Frank Wahl, North Bergen, and Arthur H. Werner, Wayne, N.J., assignors to Western Electric Company, Incorporated, New York, N.Y., a corporation of New York
Filed July 2, 1963, Ser. No. 292,422
6 Claims. (Cl. 271—56)

This invention relates to strip feeder controls for presses, particularly presses having feed rollers for advancing the strips through the operating areas.

In certain types of presses, where parts are to be punched from strips, pairs of rollers are disposed at the entrance and exit ends of the press operating areas to advance strips therethrough. The rollers at the entrance end of the operating area receive new strips and advance them intermittently, while the press is open, to feed predetermined lengths of successive strips to the press. The rollers at the exit end of the operating area are operated in timed relation with the rollers at the entrance end to assist in advancing the strips through the operating area of the press, and to advance the strip skeleton out of and beyond the operating area of the press. Commercially known feeding means of this type are capable of continuously advancing strips measured distances into and through the operating area of a press. However, in situations where strips are fed to the press with the leading edges of subsequent strips abutting the trailing edges of preceding strips, problems remain regarding the production of half or incomplete parts punched from the strips when the lengths of the strips are not accurate multiples of the lengths required for the parts. Any inaccuracies in the length or orientation of one strip would, through this system of feeding strips to a press, result in inaccuracies in all following strips.

It is an object of the present invention to provide apparatus for eliminating these problems by controlling the starting of each strip into the operating area of a press.

In accordance with the object, a strip feeder for a press of the type described has a stop adapted to interrupt the movement of each strip into the operating area of the press to present the leading end of each strip to the advancing rollers at the entrance end of the operating area at a predetermined timed interval during operating of the press.

Other objects and advantages will be apparent from the following detailed description when considered in conjunction with the accompanying drawings wherein:

FIGS. 1 and 2 when placed end to end numerically show a vertical elevational view of a press embodying the invention;

FIG. 6 is an enlarged detailed view of a portion stack of strips and the conveyor for advancing them singly toward the press;

FIG. 7 is a fragmentary front elevational view of a pair of feeding rollers to feed the strips toward the advancing rollers at the entrance end of the operating area;

FIG. 8 illustrates one means for opening the advancing rollers at the entrance end of the operating area;

FIG. 9 illustrates another means for opening these same rollers;

FIG. 10 is a fragmentary view of the punch and die of the press; and

FIG. 11 is an isometric view of a portion of a strip operated on by the press.

Figure 1:
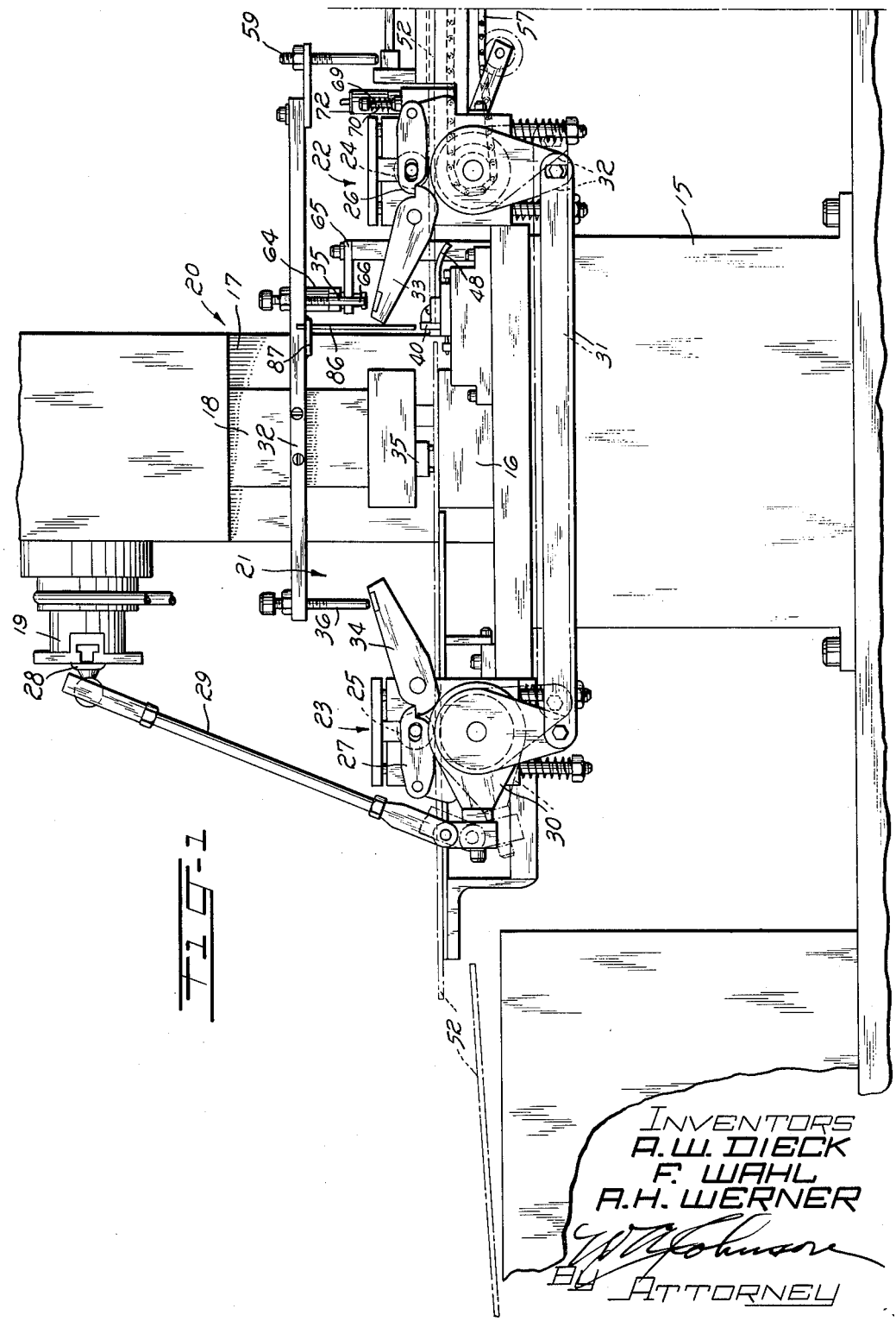
Figure 2:
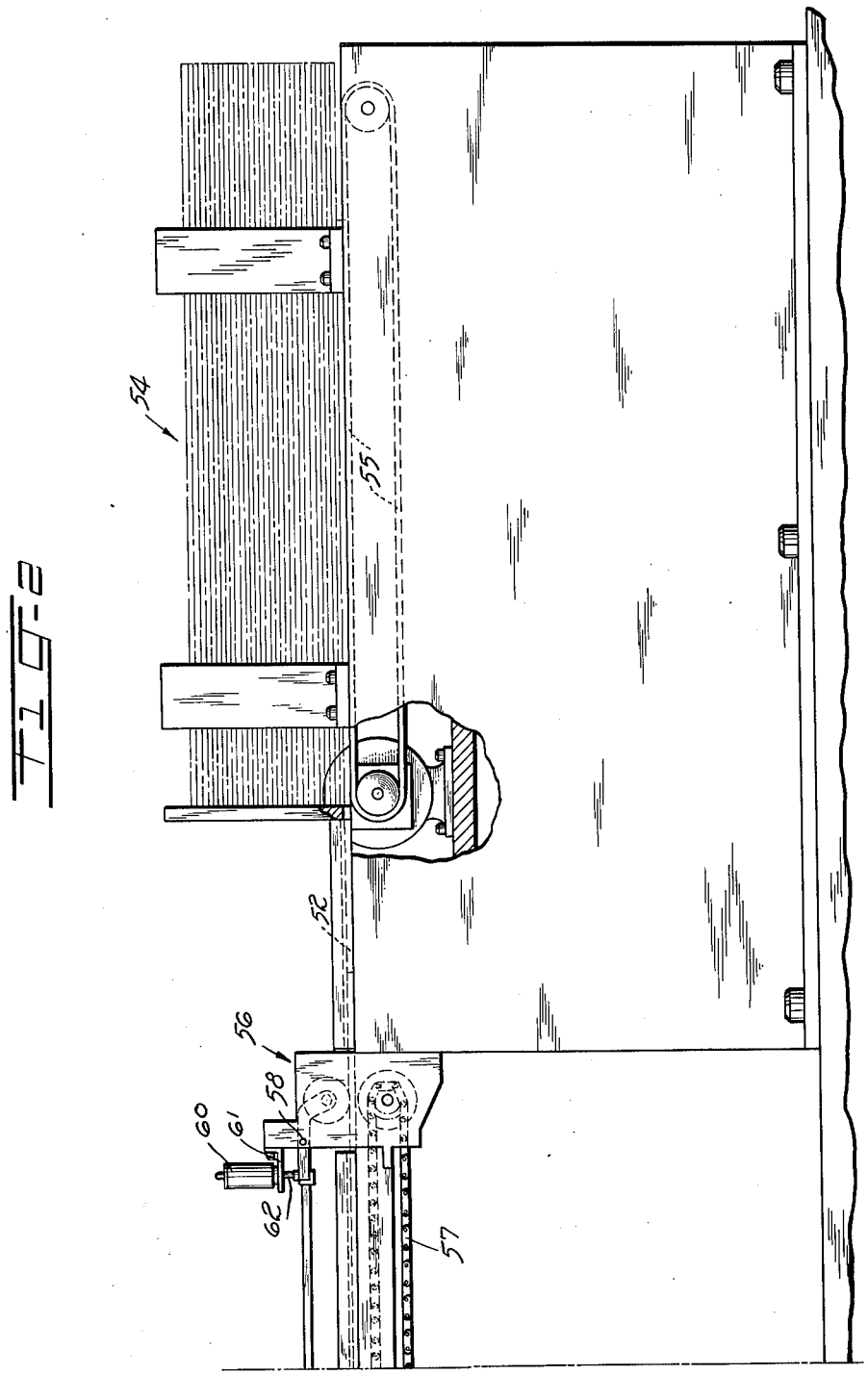

The press selected to illustrate the invention has a base 15 supporting a conventional die 16 and an upper structure 17 for a ram 18 and its associated driving mechanism 19. The press indicated generally at 20 has an operating area 21 interposed between a pair of advancing rollers 22 disposed at the entrance end of the operating area and a pair of advancing rollers 23 disposed at the exit end of the operating area. Due to the weight of the metal strips and the metal makeup of the surface of the rollers, the action of the lower rollers alone will not serve to move the strip. Therefore, upper rollers 24 and 25, pivotally mounted to the press by links 26 and 27 respectively, apply pressure to the strips to permit advancement thereof by the intermittent driving action of the lower rollers. This drive for the lower rollers is taken from drive mechanism 19 of the ram 18, through adjustable eccentric connection 28, drive rod 29, which rocks a ratchet 30 to drive rollers 23, and a connector 31 between the ratchet 30 and a ratchet 32 to drive the rollers 22. Standard rockable levers 33 and 34 are mounted on the apparatus so as to engage respective pivotal links 26 and 27 and are actuated by adjustable screws 35 and 36 supported by a bar 32 mounted on ram 18. The pairs of advancing rollers 22 and 23 are opened in this manner to free the strip in order to allow pilot pins 37 to adjust the strip relative to a punch 38, the pilot pins entering apertures 39 punched into a portion of the strip during a previous punching operation.

Once a strip has entered the operating area, rollers 22 and 23 advance each strip a given distance during the upward movement of the ram in the operating cycle. However, should any or all of the strips be of lengths which produce incomplete parts punched therefrom, the movement of the strips through the operating area in abutting engagement with each other would allow these conditions to multiply and create undesirable parts at both ends of each strip. Therefore, it is important to stop each strip in the operating area prior to the forming tools to assure accurate starting of each strip.

This is accomplished by a stop 40 (FIGS. 1 and 3) positioned to ride on the upper surface of each strip moving in the operating area toward the punch and die. The stop 40 is supported by one end of a lever 41 loosely supported at 42 on a pivot 43 mounted in a member 44. The member 44 is mounted at 45 on a stationary table 46 and has an elongated opening 47 therein in which an arm of the lever 41 is free, move to allowing stop 40 to move vertically and for a limited distance laterally therein. A guide 48, which includes a curved end 49 for receiving the advancing strips, is mounted on the table adjacent the stop 40. The guide, in association with table 46, provides a depressed or step down portion 50, so that when the trailing edge of each advancing strip passes step down portion 50, it will free the stop 40 to move downwardly in front of the leading edge 51 of each following strip. In the present illustration in FIG. 3, a strip 52 has been moving in the operating area and parts punched therefrom. A strip 53, moved from the stack 54 of strips toward the operating area by an initial feeding belt 55 and a pair of feeding rollers 56 has been caused, through these feeding means, to follow the strip 52 in abutting engagement therewith into the operating area to the starting position. The starting position is represented by the stop 40 or that position in which the leading edge of each strip is caused to rest until the next operating cycle of the press. The feeding rollers 56 are operated in timed relation with the advancing rollers 22 through a chain drive 57. The upper roller of the pair of feeding rollers 56 is pivotally supported at 58 and is provided with two means to operate it into open position; namely, an adjustable screw 59 supported by the bar 32, and by an air cylinder 60. The screw 59 opens the feeding rollers 56 with the opening of the advancing rollers 22 and 23 to permit adjustment of the strips by the pilot pins 33 and 37.

Figure 3:
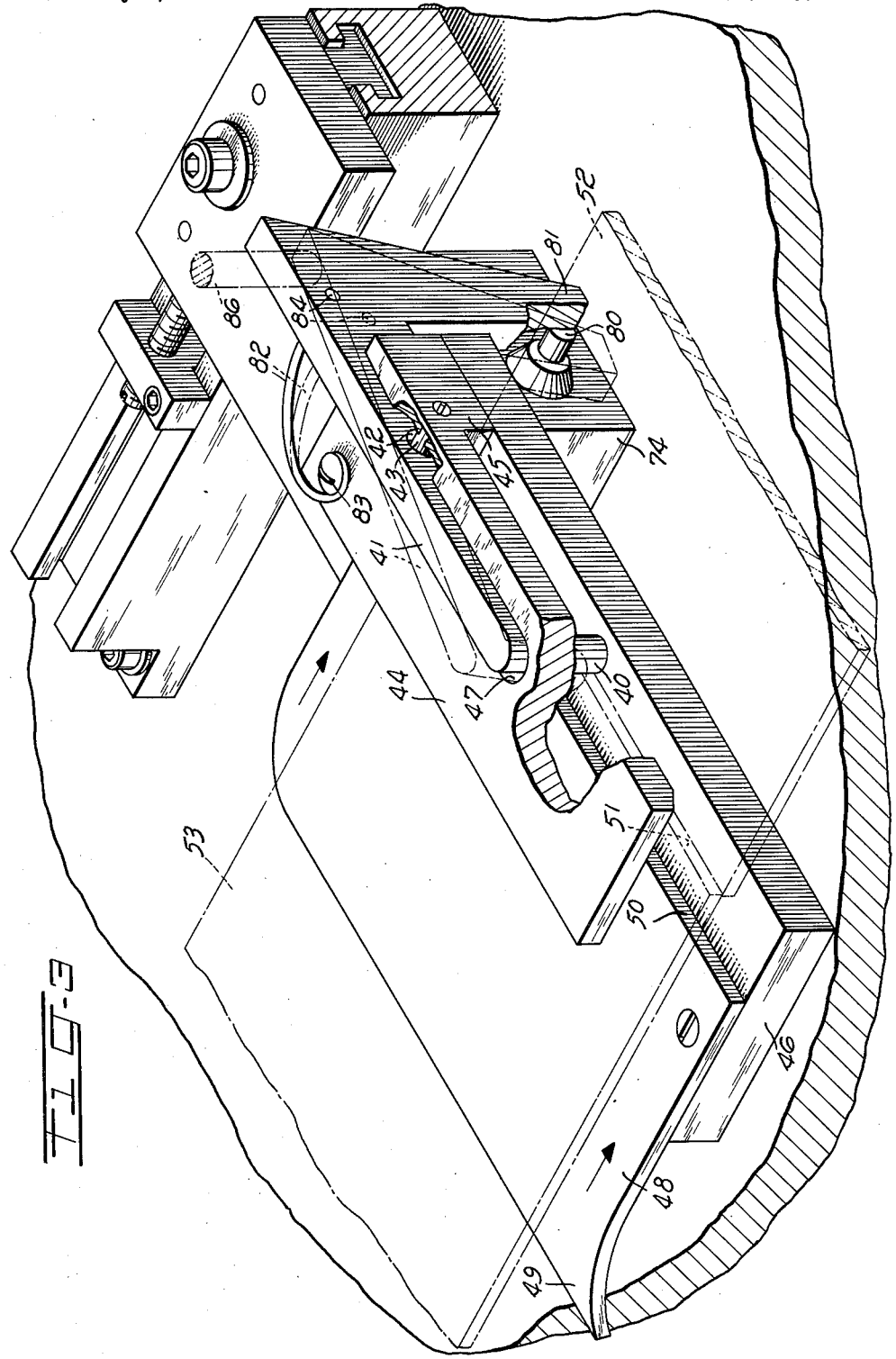
FIG. 3 is an enlarged fragmentary isometric view of the stop for the successive strips.
Figure 4:
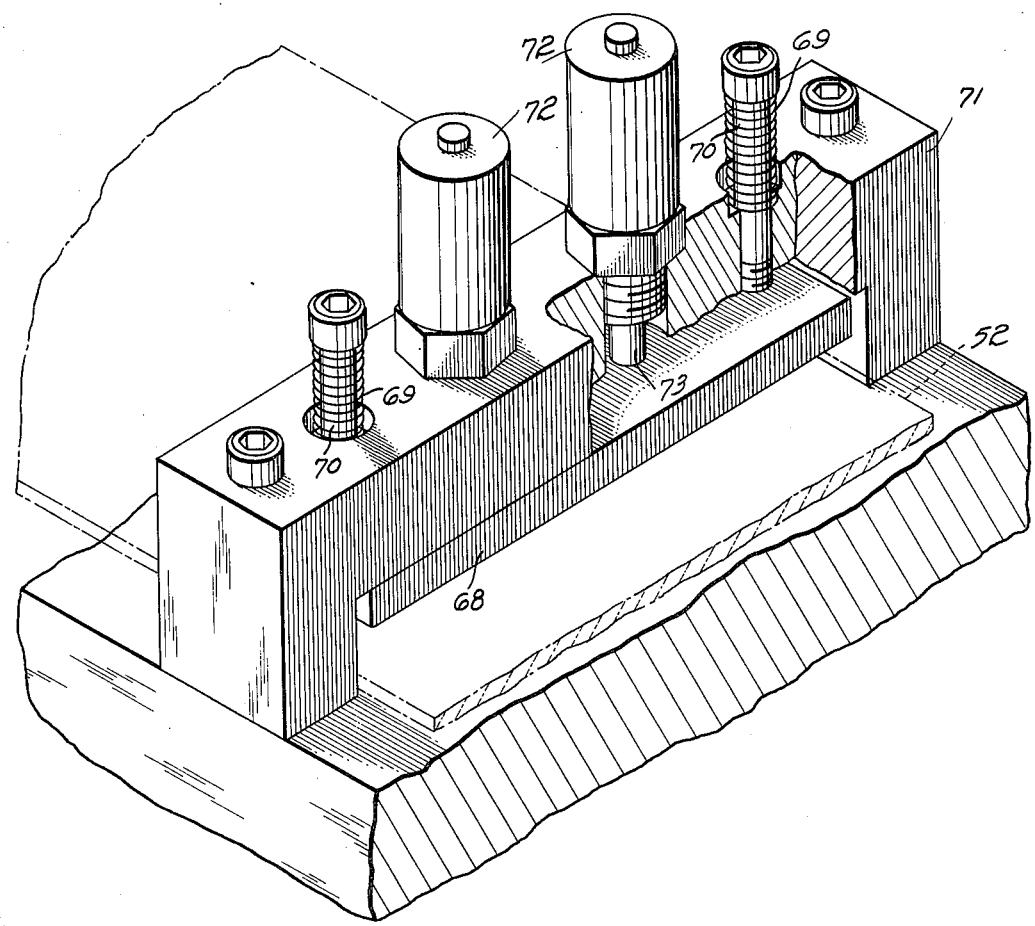
FIG. 4 is an enlarged fragmentary isometric view of the brake for the successive strips.
Figure 5:
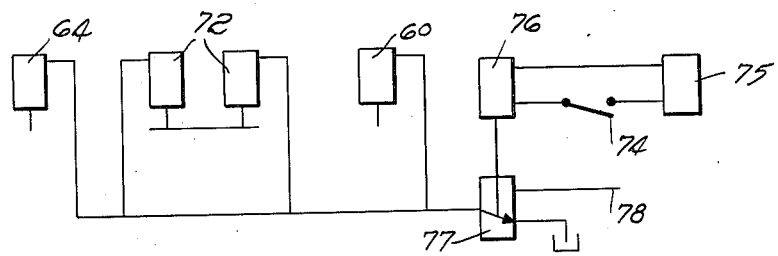
FIG. 5 is a schematic illustration of the control means.

The air cylinder 60 is a part of a control means responsive to the stop 40 and is mounted on a bracket 61 so that when it is operated, its piston rod 62 will rock the upper roller of the pair of rollers 56 about its pivot 58 into its open position. A similar air cylinder 64, mounted on a bracket 65, is positioned so that when the air cylinder is operated, its piston rod 66 will engage the lever 33 and cause opening of the advancing rollers 22. The control means also includes a brake pad 68 (FIG. 4) which extends across the path of the successive strips and is normally held above the strips by springs 69 concentric with rods 70, the lower ends of which are secured to the brake pad. A supporting bracket 71 for this structure carries a pair of air cylinders 72, the piston rods 73 of which are fixed to the brake pad 68. The control means for the air cylinders 60, 64 and 72 originate with a normally open switch 74 (FIGS. 3 and 5). With reference to FIG. 5, the switch 74, when closed, will complete a circuit from a source of electrical energy 75 through a solenoid 76 to operate a valve 77 to connect a supply line 78 for air under pressure to the air cylinders 60, 64 and 72 simultaneously.

The switch 74 (FIG. 3) has a plunger 80 positioned to be engaged by a portion 81 of lever 41. A spring 82 having one end mounted at 83 has the other end 84 connected to the lever 41 in such a way that the portion 81 of the lever 41 will be held normally against actuation of plunger 80. The stop 40, although being urged downwardly by the spring will also be urged to the left as seen in FIG. 3. A rod 86 (FIGS. 1 and 3) carried by a bracket 87 mounted on the bar 32 is positioned to engage the lever 41 and to actuate it to move the stop 40 into its up or releasing position in order to free strip 53, which had been halted. This will allow lever 41 to rock about its pivot, opening switch 74, thereby de-energizing solenoid 76. This action will cause the valve 77 (FIG. 5) to return to its normal position rendering ineffective the air cylinders 60, 64 and 72 thereby allowing the feeding rollers 56 and the advancing rollers 22 to close and the brake pad 68 (FIG. 4) to be opened or moved free of the strip.

Operation

In the absence of the strip feeder control, the strips will be fed continuously in abutting engagement with each other in successive order from the stack 54 through the feeding rollers 56 and the advancing rollers 22 into the operating area of the press where the advancing rollers 23 will pick up the scrap portions of the successive strips and continue the advancement in timed relation with the other rollers to remove the scrap material from the press. Should there be any irregularities in the lengths of the successive strips, these irregularities will result in incomplete parts, not only at the end of each strip, but at the beginning of the strips. To minimize these conditions and to be assured that the maximum number of perfect parts may be obtained from each strip, it is important that each strip start at a given interval and at the start of an operating cyle of the press and not allow it to immediately follow its preceding strip into the press.

This is brought about automatically through the operation of the stop 40 and its associated mechanism which causes the stop to depress or be flexed downwardly onto the trailing end of each strip after it passes stepped down portion 50. This results in stop 40 being located in front of the leading end of each succeeding strip, thereby halting it. The downward movement of stop 40 actuates plunger 80 of switch 74. This causes operation of the air cylinder 60 to open the feeding rollers 56, operation of the air cylinder 64 to open the advancing rollers 22 and operation of the air cylinder 72 to force the brake pad 68 onto the succeeding strip to assure stopping it at the starting position. The starting position, as illustrated in FIG. 1, is where the leading end of the successive strip is held by stop 40. When it is freed by the upward movement of stop 40, it will move into the area of the punch and die to assure punching of a complete part starting with the leading end of the strip. The strips are of sufficient length for the punching of a predetermined number of parts therefrom and after each strip has been started accurately in the operating area, it will progress through the apparatus by the standard feeding means; namely, the advancing rollers 22 and 23. As its trailing end approaches the punch and die of the press and is followed immediately by the leading end of another strip, the trailing end of the latter strip will be pushed down stepped portion 50 by the stop 40 to cause stopping of the next approaching strip. Therefore, the stop 40, assisted by the downward pressure of spring 82, finds its way in front of each strip to stop each strip at the starting position. In response to the movement of the stop, lever portion 81 actuates switch 74 to open feeding rollers 56 and advancing rollers 22, thereby causing air cylinders 72 to move brake pad 68 against the strip. This condition remains in effect until the next operating cycle of the press, when downward movement of rod 86 causes stop 41 to be moved free of the leading end of the strip by striking the rear of lever 41. This results in movement of lever portion 81 away from button 80 of switch 74, which opens the circuit to solenoid 76 and therefore renders air cylinders 60, 64 and 72 ineffective.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a punch press wherein feed means are provided to feed strips in abutting relationship towards an operating area for a punching operation, control means for halting each strip prior to its advancement to the punch press which comprises:

means for supporting strips being fed towards the operating area, stop means mounted adjacent an entrance end of the operating area and operable to engage the upper surface of each strip being fed therebeneath, and resilient means mounted on said supporting means and being cooperatively associated with said stop means for lowering said stop means in front of a succeeding strip to block the forward movement thereof when a preceding strip is fed past said stop means to the press operating area, and means responsive to a stroke of the punch press for moving the stop out of the path of the succeeding strip so that the strip may be advanced into the punch press operating area.

2. In a punch press wherein feed means are provided to feed strips towards an operating area for a punching operation, control means for halting each strip prior to its advancement to the punch press which comprises:

a stop for engaging a preceding strip as it is fed towards the operating area and movable into the path of a succeeding strip when the trailing edge of the preceding strip moves past the stop, means responsive to the movement of the stop into said path for halting operation of the feed means to cease further feeding of the succeeding strip, means for moving the stop out of the path of the succeeding strip at a predetermined interval during the punch cycle, and means for resuming the operation of the feed means so that the succeeding strip may be advanced into the punch press operating area.

3. In a punch press wherein feed means are provided to intermittently feed strips in abutting relationship towards an operating area for a punching operation, a control means for halting each strip prior to its advancement to the punch press which comprises:

means for supporting strips being fed towards the operating area, stop means mounted a predetermined distance from an entrance end of the punch press operating area and operable to engage the upper surface of each strip being fed therebeneath, resilient means mounted on said supporting means for lowering said stop means in front of a succeeding strip to block the forward movement thereof when a preceding strip is fed past said stop means to the press operating area, said blocked strip being halted a predetermined distance from the punch press so that, upon subsequent advancement thereof by the feed means a leading portion thereof will be precisely positioned beneath the punch, and means responsive to the lowering of said stop means for halting operation of the feed means to cease feeding the succeeding strip.

4. In a punch press wherein feed means are provided to feed strips in abutting relationship towards an operating area for a punching operation, a control means for halting each strip prior to its advancement to the punch press which comprises:

means for supporting a succession of abutting strips being fed towards the operating area and including an upper level and a lower level, stop means mounted a predetermined distance from the entrance end of the operating area and operable to engage the upper surface of each of the successive strips being fed therebeneath, resilient means mounted on said supporting means for lowering said stop means in front of a succeeding strip to block the forward movement thereof when the trailing edge of a preceding strip passes from the upper level to the lower level of said supporting means, said blocked strip being halted a predetermined distance from the punch press so that, upon subsequent advancement thereof by the feed means, a leading portion thereof will be precisely positioned beneath the punch, brake means responsive to the lowering of said stop means for engaging said successive strip to assist the stop means in halting further movement of the succeeding strip, and means responsive to the lowering of said stop means for halting operation of said feed means to cease feeding the succeeding strip.

5. In a punch press wherein feed means are provided to feed strips in abutting relationship towards an operating area for a punching operation, a control means which comprises:

means for supporting strips being fed to the operating area, stop means adjacent the entrance end of the operating area and operable to engage the upper surface of the successive strips being fed therebeneath, housing means for supporting said stop means for movement relative to the strips, resilient means mounted between said housing means and said stop means for urging said stop means downwardly on the upper surface of a first strip entering the operating area, said stop means dropping in front of a second strip to halt the movement thereof as the trailing edge of said first strip is fed past said stop means, brake means including a first fluid cylinder means and operable to engage the top of said second strip to assure a halting thereof, means including a second fluid cylinder means and operable to halt the operation of the feed means to cease feeding the second strip, and solenoid operated means responsive to the dropping of said stop means for activating said first and second fluid cylinder means.

6. In a punch press wherein feed means are provided to feed strips in abutting relationship towards an operating area for a punching operation, a control means which comprises:

means for supporting strips being fed towards the operating area, stop means mounted on said supporting means adjacent an entrance end of the operating area and operable to engage the upper surface of each strip being fed therebeneath, resilient means mounted on said supporting means for lowering said stop means in front of a succeeding strip to block the forward movement thereof when a preceding strips is fed past said stop means, and means responsive to the lowering of said stop means for engaging said succeeding strip to assure a halting of the forward movement thereof, said means including:

a brake housing provided with a brake pad mounted for reciprocal movement therein, fluid operated means mounted on said brake housing and having piston rods connected to said brake pad, and solenoid operated means for activating said fluid means to cause said brake pad to engage the top surface of the succeeding strip.

References Cited by the Examiner

UNITED STATES PATENTS

| | | | |
|---|---|---|---|
| 2,221,153 | 11/40 | Sanford. | |
| 2,701,013 | 2/55 | Klasing | 83—261 X |
| 3,045,519 | 7/62 | Sarka | 83—261 X |

M. HENSON WOOD, JR., *Primary Examiner.*

ROBERT B. REEVES, *Examiner.*